United States Patent
Awasthi et al.

(10) Patent No.: US 12,405,870 B2
(45) Date of Patent: Sep. 2, 2025

(54) SYSTEMS AND METHODS FOR ACTIVE-PASSIVE CLUSTER CONFIGURATION

(71) Applicant: Capital One Services, LLC, McLean, VA (US)

(72) Inventors: Ateet Kumar Awasthi, McKinney, TX (US); Chris Fields, Roanoke, TX (US); Saral Jain, McKinney, TX (US); Matt Howarth, Garland, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/422,126

(22) Filed: Jan. 25, 2024

(65) Prior Publication Data

US 2025/0245111 A1 Jul. 31, 2025

(51) Int. Cl.
*G06F 11/30* (2006.01)
*G06F 11/28* (2006.01)
*H04L 41/084* (2022.01)

(52) U.S. Cl.
CPC ............ *G06F 11/28* (2013.01); *H04L 41/084* (2013.01)

(58) Field of Classification Search
CPC .. G06F 11/28; G06F 11/2447; G06F 11/2069; G06F 11/2082; G06F 11/2097; G06F 11/1658
See application file for complete search history.

(56) References Cited

U.S. PATENT DOCUMENTS

| | | | |
|---|---|---|---|
| 2008/0115008 A1* | 5/2008 | Daftardar | G06F 11/2092 714/3 |
| 2022/0050719 A1* | 2/2022 | Wang | H04L 41/0895 |
| 2024/0080329 A1* | 3/2024 | Reed | G06F 16/9038 |

* cited by examiner

*Primary Examiner* — Chae M Ko
(74) *Attorney, Agent, or Firm* — Foley & Lardner LLP (57) ABSTRACT

Systems and methods for active-passive cluster configuration. In some aspects, the system receives a first service log from an active server and a second service log from a passive server, wherein the passive server mirrors the active server. The system identifies, in the first service log, a first configuration file and identifies, in the second service log, a second configuration file. The system inputs the first service log and the second service log into a model trained to identify excessive autoscaling and configuration drift by comparing the first configuration file and the second configuration file. The system, upon identifying differences between the first configuration file and the second configuration file indicative of excessive autoscaling and configuration drift, generates an alert and, based on the alert, generates one or more instructions to resolve the differences between the first configuration file and the second configuration file.

20 Claims, 4 Drawing Sheets

SYSTEMS AND METHODS FOR ACTIVE-PASSIVE CLUSTER CONFIGURATION

SUMMARY

An active-passive cluster is a high-availability configuration where two servers are set up, with one actively handling the workload (active server), and the other remaining in standby mode (passive server). The primary purpose of this setup is to enhance system reliability and minimize downtime in the event of a failure. Active-passive clusters provide a robust solution for maintaining continuous operation and minimizing the impact of failures or maintenance. They are commonly used in critical systems where downtime is not acceptable and high availability is paramount.

The active server actively processes requests, handles the primary workload, and serves as the main point of interaction for users or applications. It constantly updates its data and configurations. The passive server mirrors the state of the active server. It remains in a standby mode, ready to take over operations if the active server fails. The passive server ensures it has up-to-date data and configurations through continuous synchronization. In the event of a failure or planned maintenance on the active server, a failover mechanism is triggered. This mechanism redirects the workload to the passive server seamlessly. Users or applications experience minimal disruption as the passive server quickly assumes the responsibilities of the active server.

To ensure a smooth failover, the active and passive servers must stay synchronized. This involves replicating data, configurations, and sometimes even the entire state of the active server to the passive server. Various synchronization methods, such as real-time replication or periodic updates, can be employed. This is crucial for applications and services that require high availability, such as e-commerce platforms, databases, or critical business applications. Further, planned maintenance on the active server can be performed without affecting service availability. During maintenance, the passive server takes over, and once maintenance is complete, the roles can be switched back seamlessly.

While active-passive clusters offer increased reliability, they are not without challenges. Some common problems include resource utilization and complexity in configuration. For example, the passive server remains idle most of the time, leading to underutilization of resources. This can be inefficient, especially in terms of hardware and energy usage. Further, setting up and configuring an active-passive cluster correctly can be complex. Misconfigurations may lead to suboptimal performance or unexpected behavior during failover events. To address these challenges, systems and methods are described herein for active-passive cluster configuration to manage the active-passive cluster and address these potential issues effectively.

As one example, methods and systems are described herein for a framework to analyze an active-passive cluster for stabilization and resource-saving opportunities. In some aspects, the system analyzes configurations for the active server and the passive server for one or more applications and reports any configuration drift between the two servers. For example, the system may report on excessive autoscaling events and recommend resource configuration changes to keep from constantly autoscaling tasks up and down. The system may analyze autoscaling minimum and maximum settings to find configurations where the minimum is set to the same as the maximum or where the minimum is set higher than what the service utilization would need during low demand periods. The system may scan the cluster to identify applications with memory leaks causing over utilization of infrastructure resources. The system may maintain a historical log of changes that were made to the services over time. This log may be beneficial for subsequent analysis of the active-passive cluster.

In some embodiments, the system may be used post-deployment to validate that the configurations between the active server and the passive server did not drift apart. In some embodiments, the system may identify a suitable performance configuration for an application which provides head room for unexpected demand and is based on the underlying infrastructure. The framework is designed to run at scale with a large number of clusters searching for deployment mismatches in real time deployments as they are happening. Also the system may scan to identify applications with memory leaks causing over utilization of infrastructure resources.

Existing systems do not have any capabilities for analyzing and recommending changes to help stabilize the applications running in active-passive clusters. Further, these existing systems do not contemplate reducing the minimum number of instances in the autoscaling group, based on utilization, which can further reduce resource consumption of the active-passive cluster.

To overcome these technical deficiencies in active-passive clusters for this practical benefit, methods and systems disclosed herein improve active-passive cluster configurations without reducing microservice functionality or availability, thereby increasing efficiency of active-passive cluster configurations. The methods and systems relate to identifying inefficiencies in active-passive cluster configurations and generating recommendations to improve efficiency (e.g., a recommendation to modify resource allocation on a cluster). This is challenging because it is difficult to identify inefficiencies due to the large number of microservices running on each cluster, as well as to identify reliable steps to mitigate the inefficiencies. Additionally, it is challenging to determine alterations to cluster configurations that will reduce inefficiencies.

In some aspects, the methods and systems identify inefficiencies using a cluster analysis framework (e.g., memory leak, excessive autoscaling, or configuration drift) and recommend mitigating actions on a microservice level based on identified inefficiencies (e.g., adjusting autoscaling, adjusting memory available, adjusting CPU usage).

In some aspects, the system receives a first service log from an active server and a second service log from a passive server, wherein the passive server mirrors the active server, wherein the first service log comprises first metadata corresponding to the active server, and wherein the second service log comprises second metadata corresponding to the passive server, wherein the passive server serves as a backup for the active server. The system identifies, in the first service log, a first configuration file, wherein the first configuration file comprises a first plurality of microservices hosted by the active server, a first instantiation threshold, and a first destruction threshold, wherein the first instantiation threshold and the first destruction threshold are based on availability of processing resources, wherein a configuration of the passive server is changed to match a configuration of the active server in response to exceeding the first instantiation threshold, and wherein the configuration of the passive server is changed to match the configuration of the active server in response to falling below the first destruction threshold. The system identifies, in the second service log, a second configuration file, wherein the second configuration file comprises a second plurality of microservices hosted by the passive server. The system inputs the first service log and the second service log into a model, wherein the model is trained to identify excessive autoscaling and configuration drift, by comparing the first configuration file and the second configuration file. The system, upon identifying differences between the first configuration file and the second configuration file indicative of excessive autoscaling and configuration drift, generates an alert, wherein the alert indicates the differences in the first configuration file and the second configuration file. The system, based on the alert, generates one or more instructions, wherein the one or more instructions comprises one or more actions to resolve the differences between the first configuration file and the second configuration file to mitigate excessive autoscaling and configuration drift of the microservices hosted by the active server or the passive server.

Various other aspects, features, and advantages of the disclosure will be apparent through the detailed description of the invention and the drawings attached hereto. It is also to be understood that both the foregoing general description and the following detailed description are examples and are not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
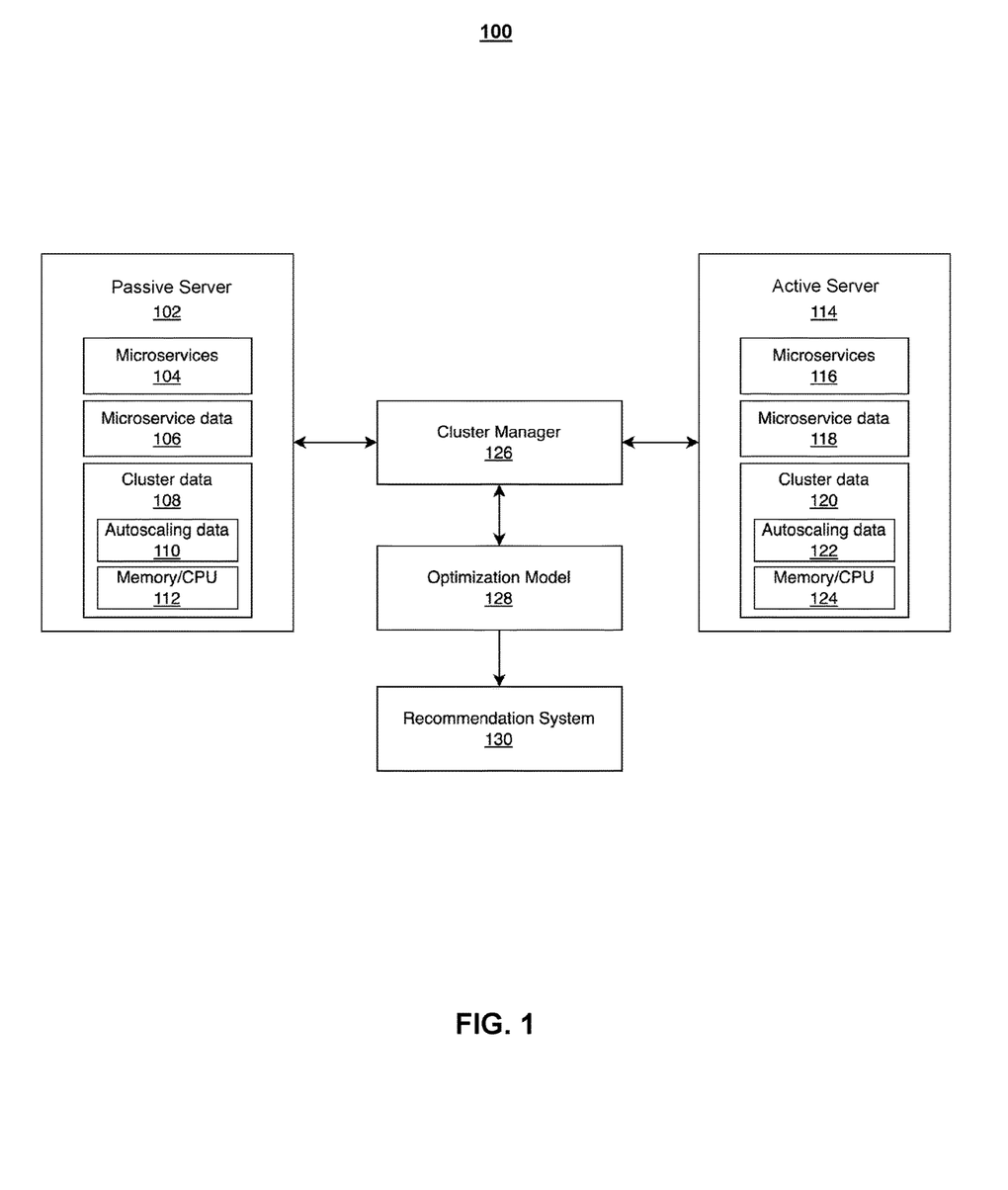
FIG. 1 shows an illustrative block diagram for a system used for active-passive cluster configuration, in accordance with one or more embodiments.

FIG. 1 shows an illustrative diagram 100 for a system used for active-passive cluster configuration, in accordance with one or more embodiments. For example, the system relates to identifying inefficiencies in active-passive cluster configurations, such as those for passive server 102 and active server 114, and generating recommendations to improve efficiency (e.g., a recommendation to modify resource allocation on a cluster). This is challenging because it is difficult to identify inefficiencies due to the large number of microservices running on each cluster, as well as to identify reliable steps to mitigate the inefficiencies. Additionally, it is challenging to determine alterations to cluster configurations that will reduce inefficiencies.

Passive server 102 may mirror active server 114. The passive server may be associated with a log comprising metadata for the passive server. The log can include information corresponding to the passive server, such as metadata pertaining to the passive server including microservices 104, microservice data 106, cluster data 108, autoscaling data 110, and memory/CPU data 112. Similarly, the active server may be associated with a log comprising metadata for the active server. The log can include information corresponding to the active server, such as metadata pertaining to the active server including microservices 116, microservice data 118, cluster data 120, autoscaling data 122, and memory/CPU data 124.

By receiving both logs, the system can reference the metadata of both nodes (e.g., an active and passive server). The system may use a cluster analysis framework (e.g., memory leak, excessive autoscaling, or configuration drift) including cluster manager 126, optimization model 128, and recommendation system 130. The system may recommend mitigating actions on a microservice level based on identified inefficiencies (e.g., adjusting autoscaling, adjusting memory available, adjusting CPU usage).

Figure 2:
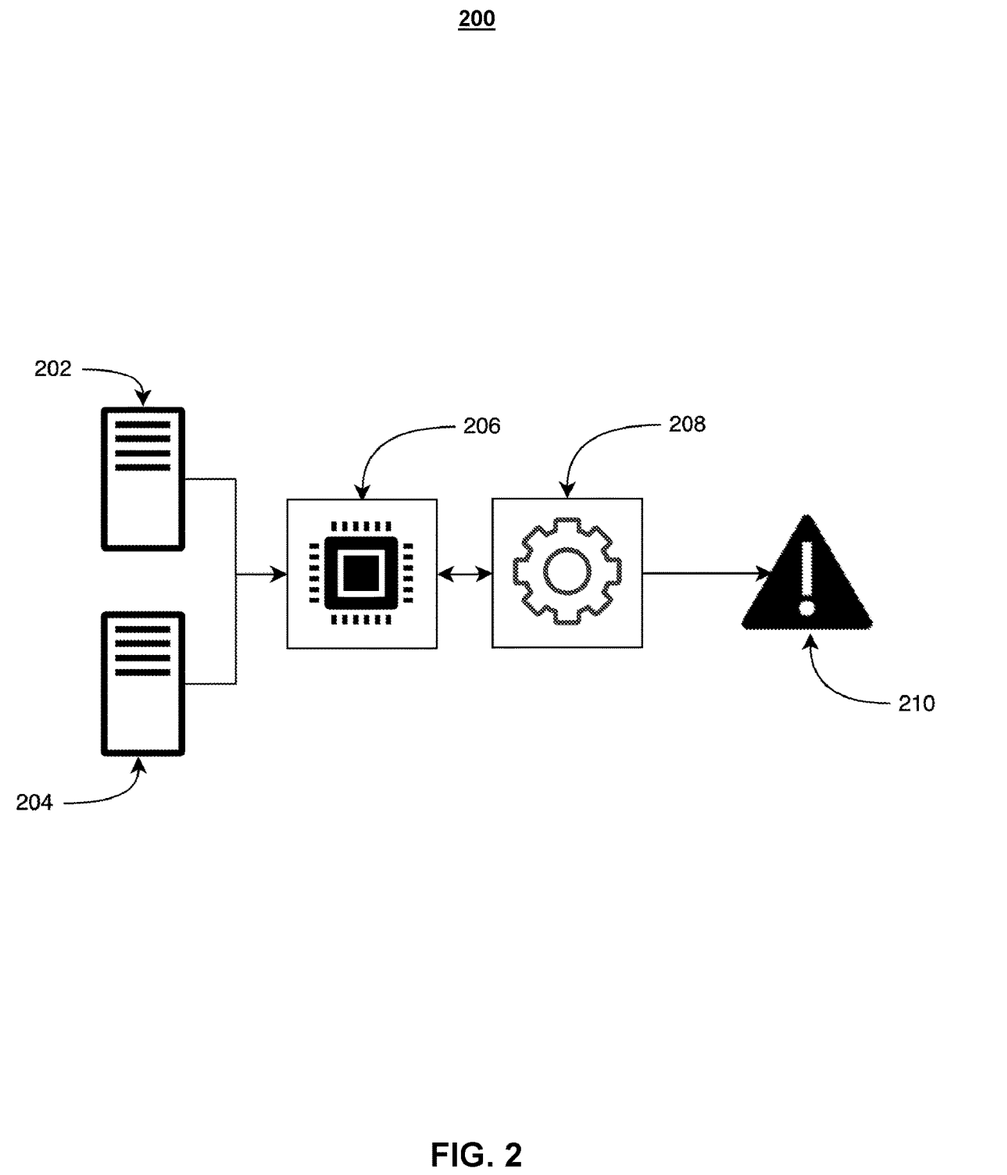
FIG. 2 shows an illustrative diagram for active-passive cluster configuration, in accordance with one or more embodiments.

FIG. 2 shows an illustrative diagram 200 for active-passive cluster configuration, in accordance with one or more embodiments. For example, the system may use cluster manager 206 in order to increase efficiency of active-passive cluster including active server 202 and passive server 204. The cluster manager 206 may change a configuration of the passive server to match a configuration of the active server in response to exceeding a first instantiation threshold. The configuration of the passive server may be changed to match the configuration of the active server in response to falling below a first destruction threshold. The system may process logs for the active-passive cluster using optimization model 208 and generate recommendation 210 to mitigate actions on a microservice level based on identified inefficiencies (e.g., adjusting autoscaling, adjusting memory available, adjusting CPU usage). For example, the system receives a first log from active server 202 and a second log from passive server 204. The passive server mirrors the active server. The first log includes first metadata corresponding to the active server. The second log includes second metadata corresponding to the passive server. For example, the system may receive two logs from the active-passive cluster. The first log may correspond to the active server in an active-passive server cluster. The log can include information corresponding to the active server, such as metadata pertaining to the server (e.g., number of active connections, load, CPU usage, or memory usage). Similarly, the system may receive a second log that corresponds to the passive server in an active-passive server cluster. The second log can include information corresponding to the passive server such as metadata pertaining to the server. By receiving both logs, the system can reference the metadata of both nodes of the active-passive cluster.

The system may use optimization model 208 to process the first log and the second log. For example, the system inputs the first log and the second log into the optimization model trained to identify an inefficiency (e.g., excessive autoscaling (e.g., due to a memory leak or higher demand) or a configuration drift or another suitable inefficiency).

Upon identifying differences between the first configuration file and the second configuration file (e.g., differences indicative of excessive autoscaling or configuration drift), the system may generate recommendation 210 including an alert indicating the differences in the first configuration file and the second configuration file and one or more instructions for one or more actions to resolve the differences between the first configuration file and the second configuration file to mitigate the inefficiency (e.g., excessive autoscaling or configuration drift of microservices hosted by the active server or the passive server). For example, the system may identify an inefficiency between the first log and the second log. For example, the system can input the first and second log into a model trained to identify an inefficiency between the first node and the second node, such as excessive autoscaling (e.g., due to a memory leak or higher demand) or a configuration drift or another suitable inefficiency. For example, the system generates instructions that comprise a recommended action to resolve the inefficiency via a modification to the first configuration file and/or the second configuration file.

In some embodiments, the recommended action is generated by determining a frequent scaling event, wherein the frequent scaling event is determined by retrieving an expected number of auto-scale events within a time interval, retrieving a number of auto-scale events within the time interval, and based on the number of auto-scale events exceeding the expected number of auto-scale events, determining the frequent scaling event, and generating the recommended action, wherein the recommended action comprises at least one of a log analysis recommendation, a microservice optimization recommendation, and an update to the first instantiation threshold, the second instantiation threshold, the first destruction threshold, and/or the second destruction threshold based on what caused the frequent scaling event.

In some embodiments, the recommended action is time-based and based on a baseline of the first node in a timeframe (e.g., a baseline number of users over the course of a week (e.g., thanksgiving week or new year's day)) by recommending a reduction in resources at off-peak hours, wherein the off-peak hours occur when CPU usage and memory usage are lower than the baseline, and wherein the reduction in resources comprises increasing the first destruction threshold and the second destruction threshold and recommending an increase in resources during peak hours, wherein the peak hours occur when CPU usage and memory usage are higher than the baseline, and wherein the increase in resources comprises decreasing the first instantiation threshold and the second instantiation threshold.

In some embodiments, the recommended action is based on historical usage of the first node by determining a historical use of the first node corresponding to a first timeframe, wherein the historical use is a percentage of CPU usage, a percentage of memory use, or a number of users, and updating the recommended action to recommend updates to the first instantiation threshold, the second instantiation threshold, the first destruction threshold, and the second destruction threshold.

In some embodiments, the recommended action is generated by determining that the inefficiency is excessive autoscaling, wherein the excessive autoscaling occurs when there is an increase in resources such that it negatively impacts the first node or the second node, or when there is a decrease in resources such that it negatively impacts the first node or the second node, wherein negatively impacting the first node or the second node comprises causing interruptions to one or more of the first plurality of applications on the first node and/or one or more of the second plurality of applications the second node, and generating the recommended action to resolve the inefficiency, wherein the recommended action includes reviewing and adjusting autoscaling parameters associated with the first node and the second node.

In some embodiments, the system generates the alert by determining the inefficiency is configuration drift, wherein the configuration drift occurs when an alteration is made to the first configuration file, and the alteration is not made to the second configuration file, and generating the recommended action to resolve the inefficiency, wherein the recommended action includes reviewing the first log and the second log and updating the first configuration file and the second configuration file to remove any differences in configuration.

In some embodiments, the system generates the alert by determining that the inefficiency is excessive autoscaling, wherein the excessive autoscaling occurs when the first instantiation threshold and the first destruction threshold are met within a threshold time period or when the second instantiation threshold and the second destruction threshold are met within the threshold time period, and generating the recommended action to resolve the inefficiency, wherein the recommended action includes reviewing and adjusting autoscaling parameters associated with the first node and the second node.

In some embodiments, the differences in the first configuration file and the second configuration file correspond to release versions, wherein the release versions can be determined by identifying a first release version of the first configuration file associated with the first log, wherein the first release version corresponds to when the first configuration file was associated with the first node, identifying a second release version of the second configuration file associated with the second log, wherein the second release version corresponds to when the second configuration file was associated with the second node, comparing the first release version and the second release version and determining that the release versions are different when they do not match, and updating the recommended action to include instructions to update the first release version of the first configuration file or to update the second release version of the second configuration file.

Figure 3:
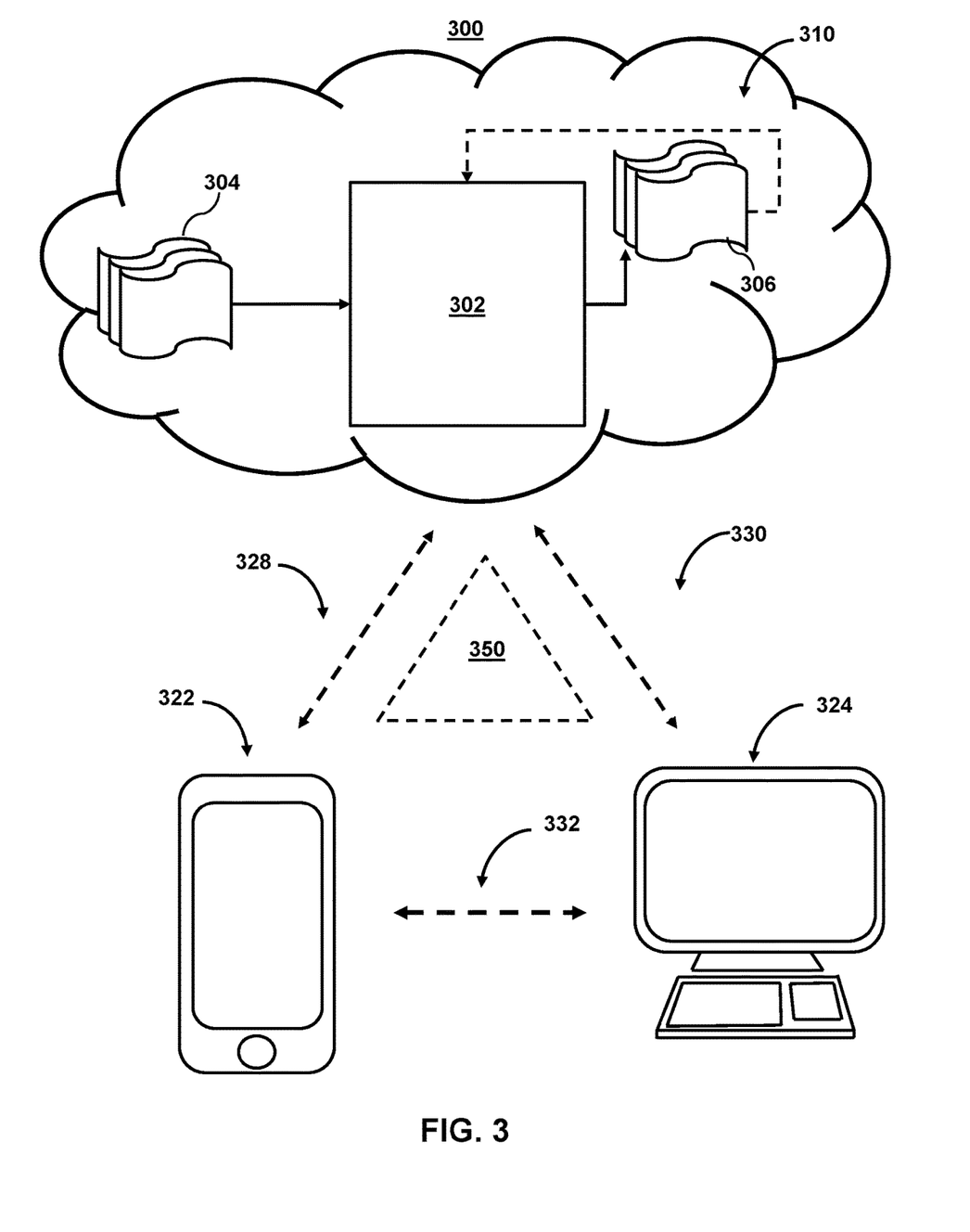
FIG. 3 shows illustrative components for a system used for active-passive cluster configuration, in accordance with one or more embodiments.

FIG. 3 shows illustrative components for a system used for active-passive cluster configuration, in accordance with one or more embodiments. For example, FIG. 3 may show illustrative components for identifying inefficiencies in active-passive cluster configurations, such as those for passive server 102 and active server 114, and generating recommendations to improve efficiency (e.g., a recommendation to modify resource allocation on a cluster). As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include active server 114 and passive server 102. Cloud components 310 may access cluster manager 126, optimization model 128, and recommendation system 130.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., inefficiencies in active-passive cluster configurations).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., inefficiencies in active-passive cluster configurations).

In some embodiments, the model (e.g., model 302) may automatically perform actions based on outputs 306. In some embodiments, the model (e.g., model 302) may not perform any actions. The output of the model (e.g., model 302) may be used to identify inefficiencies in active-passive cluster configurations.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
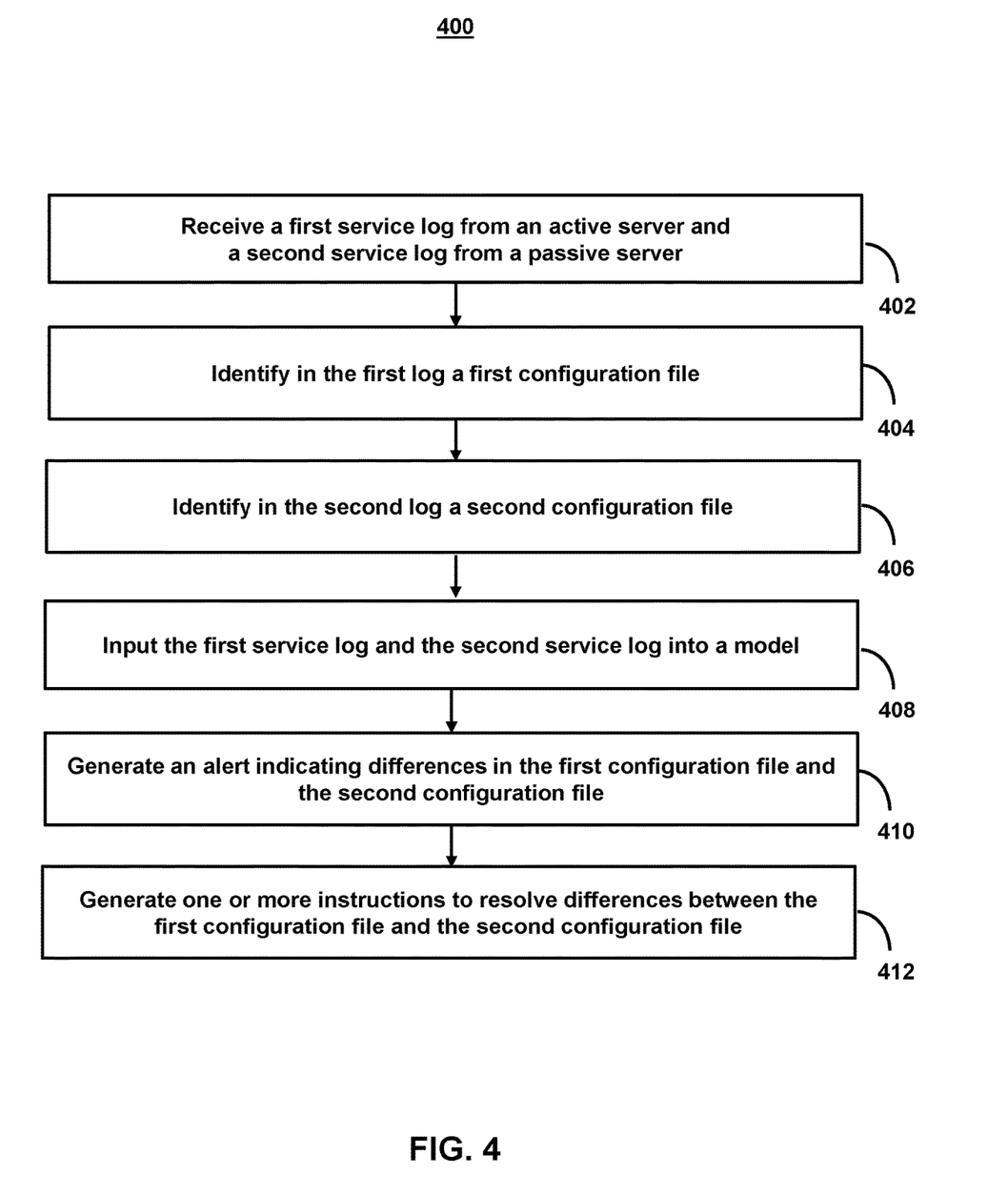
FIG. 4 shows a flowchart of the steps involved in active-passive cluster configuration, in accordance with one or more embodiments.

FIG. 4 shows a flowchart of the steps involved in active-passive cluster configuration, in accordance with one or more embodiments. For example, the system may use process 400 (e.g., as implemented on one or more system components described above) in order to increase efficiency of active-passive cluster configurations.

At step 402, process 400 (e.g., using one or more components described above) receives a first service log and a second service log. For example, the system receives a first log from a first node and a second log from a second node. The second node mirrors the first node. The first log comprises first metadata corresponding to the first node. The second log comprises second metadata corresponding to the second node. For example, the system may receive two logs from two nodes. The first log may correspond to an active server in an active-passive server cluster. The log can include information corresponding to the first node, such as metadata pertaining to the server (e.g., number of active connections, load, CPU usage, or memory usage). Similarly, the system may receive a second log that corresponds to a passive server in an active-passive server cluster. The second log can include information corresponding to the second node such as metadata pertaining to the server. By receiving both logs, the system can reference the metadata of two nodes (e.g., an active and passive server).

At step 404, process 400 (e.g., using one or more components described above) identifies in the first service log a first configuration file. The first log may correspond to an active server in an active-passive server cluster. The first configuration file may include a first plurality of microservices hosted by the active server.

At step 406, process 400 (e.g., using one or more components described above) identifies in the second service log a second configuration file. The second log may correspond to a passive server in the active-passive server cluster. The second configuration file may include a second plurality of microservices hosted by the passive server.

At step 408, process 400 (e.g., using one or more components described above) inputs the first log and the second log into a model. For example, the system inputs the first log and the second log into a model trained to identify an inefficiency (e.g., excessive autoscaling (e.g., due to a memory leak or higher demand) or a configuration drift or another suitable inefficiency), by identifying, in the first configuration file a first plurality of applications, a first instantiation threshold, and a first destruction threshold, identifying, in the second configuration file a second plurality of applications, a second instantiation threshold, and a second destruction threshold, and comparing the first configuration file and the second configuration file.

In some embodiments, the first instantiation threshold and the first destruction threshold are based on availability of processing resources. A configuration of the passive server is changed to match a configuration of the active server in response to exceeding the first instantiation threshold. The configuration of the passive server is changed to match the configuration of the active server in response to falling below the first destruction threshold.

In some embodiments, the first instantiation threshold, the second instantiation threshold, the first destruction threshold, and the second destruction threshold comprise a CPU usage percentage, wherein the CPU usage percentage is a percentage of CPU available to the first node or the second node that is used to host the first plurality of applications or the second plurality of applications.

In some embodiments, the first instantiation threshold, the second instantiation threshold, the first destruction threshold, and the second destruction threshold comprise a memory usage percentage, wherein the memory usage percentage is a percentage of memory available to the first node or the second node that is used to host the first plurality of applications or the second plurality of applications.

At step 410, process 400 (e.g., using one or more components described above), upon identifying differences between the first configuration file and the second configuration file (e.g., differences indicative of excessive autoscaling or configuration drift), generates an alert indicating the differences in the first configuration file and the second configuration file. For example, the system may identify an inefficiency between the first log and the second log. For example, the system can input the first and second log into a model trained to identify an inefficiency between the first node and the second node, such as excessive autoscaling (e.g., due to a memory leak or higher demand) or a configuration drift or another suitable inefficiency.

At step 412, process 400 (e.g., using one or more components described above) generates one or more instructions for one or more actions to resolve the differences between the first configuration file and the second configuration file to mitigate the inefficiency (e.g., excessive autoscaling or configuration drift of microservices hosted by the active server or the passive server). For example, the system generates instructions that comprise a recommended action to resolve the inefficiency via a modification to the first configuration file and/or the second configuration file.

In some embodiments, the recommended action is generated by determining a frequent scaling event, wherein the frequent scaling event is determined by retrieving an expected number of auto-scale events within a time interval, retrieving a number of auto-scale events within the time interval, and based on the number of auto-scale events exceeding the expected number of auto-scale events, determining the frequent scaling event, and generating the recommended action, wherein the recommended action comprises at least one of a log analysis recommendation, a microservice optimization recommendation, and an update to the first instantiation threshold, the second instantiation threshold, the first destruction threshold, and/or the second destruction threshold based on what caused the frequent scaling event.

In some embodiments, the recommended action is time-based and based on a baseline of the first node in a timeframe (e.g., a baseline number of users over the course of a week (e.g., thanksgiving week or new year's day)) by recommending a reduction in resources at off-peak hours, wherein the off-peak hours occur when CPU usage and memory usage are lower than the baseline, and wherein the reduction in resources comprises increasing the first destruction threshold and the second destruction threshold and recommending an increase in resources during peak hours, wherein the peak hours occur when CPU usage and memory usage are higher than the baseline, and wherein the increase in resources comprises decreasing the first instantiation threshold and the second instantiation threshold.

In some embodiments, the recommended action is based on historical usage of the first node by determining a historical use of the first node corresponding to a first timeframe, wherein the historical use is a percentage of CPU usage, a percentage of memory use, or a number of users, and updating the recommended action to recommend updates to the first instantiation threshold, the second instantiation threshold, the first destruction threshold, and the second destruction threshold.

In some embodiments, the recommended action is generated by determining that the inefficiency is excessive autoscaling, wherein the excessive autoscaling occurs when there is an increase in resources such that it negatively impacts the first node or the second node, or when there is a decrease in resources such that it negatively impacts the first node or the second node, wherein negatively impacting the first node or the second node comprises causing interruptions to one or more of the first plurality of applications on the first node and/or one or more of the second plurality of applications on the second node, and generating the recommended action to resolve the inefficiency, wherein the recommended action includes reviewing and adjusting auto-scaling parameters associated with the first node and the second node.

In some embodiments, the system includes a cluster manager, wherein the cluster manager performs the recommended action included in the alert.

In some embodiments, the system generates the alert by determining the inefficiency is configuration drift, wherein the configuration drift occurs when an alteration is made to the first configuration file, and the alteration is not made to the second configuration file. The system generates the recommended action to resolve the inefficiency, wherein the recommended action includes reviewing the first log and the second log and updating the first configuration file and the second configuration file to remove any differences in configuration.

In some embodiments, the system generates the alert by determining that the inefficiency is excessive autoscaling, wherein the excessive autoscaling occurs when the first instantiation threshold and the first destruction threshold are met within a threshold time period or when the second instantiation threshold and the second destruction threshold are met within the threshold time period. The system generates the recommended action to resolve the inefficiency, wherein the recommended action includes reviewing and adjusting auto-scaling parameters associated with the first node and the second node.

In some embodiments, the differences in the first configuration file and the second configuration file correspond to release versions, wherein the release versions can be determined by identifying a first release version of the first configuration file associated with the first log, wherein the first release version corresponds to when the first configuration file was associated with the first node, identifying a second release version of the second configuration file associated with the second log, wherein the second release version corresponds to when the second configuration file was associated with the second node, comparing the first release version and the second release version and determining that the release versions are different when they do not match, and updating the recommended action to include instructions to update the first release version of the first configuration file or to update the second release version of the second configuration file.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a first service log from an active server and a second service log from a passive server, wherein the passive server mirrors the active server, wherein the first service log comprises first metadata corresponding to the active server, and wherein the second service log comprises second metadata corresponding to the passive server, wherein the passive server serves as a backup for the active server; identifying, in the first service log, a first configuration file, wherein the first configuration file comprises a first plurality of microservices hosted by the active server, a first instantiation threshold, and a first destruction threshold, wherein the first instantiation threshold and the first destruction threshold are based on availability of processing resources, wherein a configuration of the passive server is changed to match a configuration of the active server in response to exceeding the first instantiation threshold, and wherein the configuration of the passive server is changed to match the configuration of the active server in response to falling below the first destruction threshold; identifying, in the second service log, a second configuration file, wherein the second configuration file comprises a second plurality of microservices hosted by the passive server; inputting the first service log and the second service log into a model, wherein the model is trained to identify excessive autoscaling and configuration drift, by comparing the first configuration file and the second configuration file; upon identifying differences between the first configuration file and the second configuration file indicative of excessive autoscaling and configuration drift, generating an alert, wherein the alert indicates the differences in the first configuration file and the second configuration file; and based on the alert, generating one or more instructions, wherein the one or more instructions comprises one or more actions to resolve the differences between the first configuration file and the second configuration file to mitigate excessive autoscaling and configuration drift of microservices hosted by the active server or the passive server.

2. A method, the method comprising: receiving a first log from a first node and a second log from a second node, wherein the second node mirrors the first node, wherein the first log comprises first metadata corresponding to the first node, and wherein the second log comprises second metadata corresponding to the second node; processing the first log and the second log to identify an inefficiency, by: identifying, in the first log, a first configuration file, wherein the first configuration file comprises a first plurality of applications, a first instantiation threshold, and a first destruction threshold; identifying, in the second log, a second configuration file, wherein the second configuration file comprises a second plurality of applications, a second instantiation threshold, and a second destruction threshold; comparing the first configuration file and the second configuration file; and upon identifying differences between the first configuration file and the second configuration file, assigning the differences as the inefficiency; and generating an alert, based on the inefficiency, wherein the alert comprises a recommended action to resolve the inefficiency, wherein the recommended action comprises a modification to the first configuration file and/or the second configuration file.

3. A method, the method comprising: receiving a first log from a first node and a second log from a second node, wherein the second node mirrors the first node, wherein the first log comprises first metadata corresponding to the first node, and wherein the second log comprises second metadata corresponding to the second node; processing the first log and the second log to identify an inefficiency, by: identifying, in the first log, a first configuration file, wherein the first configuration file comprises a first plurality of applications, a first instantiation threshold, and a first destruction threshold; identifying, in the second log, a second configuration file, wherein the second configuration file comprises a second plurality of applications, a second instantiation threshold, and a second destruction threshold; comparing the first configuration file and the second configuration file; upon identifying differences between the first configuration file and the second configuration file, assigning the differences as the inefficiency; generating a recommended action to resolve the inefficiency, wherein the recommended action comprises a modification to the first configuration file and/or the second configuration file; and performing the recommended action, by a cluster manager, wherein the cluster manager can make changes to the first configuration file and the second configuration file.

4. The method of any one of the preceding embodiments, wherein the first metadata and the second metadata include configuration information associated with the active server and the passive server, wherein the configuration information comprises a plurality of microservices, and a number of resources allocated to each microservice in the plurality of microservices, wherein the number of resources includes an instantiation threshold and a destruction threshold.

5. The method of any one of the preceding embodiments, further comprising a cluster manager, wherein the cluster manager performs the recommended action included in the alert.

6. The method of any one of the preceding embodiments, wherein generating the alert further comprises: determining the inefficiency is configuration drift, wherein the configuration drift occurs when an alteration is made to the first configuration file, and the alteration is not made to the second configuration file; and generating the recommended action to resolve the inefficiency, wherein the recommended action includes reviewing the first log and the second log and updating the first configuration file and the second configuration file to resolve differences in configuration.

7. The method of any one of the preceding embodiments, wherein generating the alert further comprises: determining that the inefficiency is excessive autoscaling, wherein the excessive autoscaling occurs when the first instantiation threshold and the first destruction threshold are met within a threshold time period or when the second instantiation threshold and the second destruction threshold are met within the threshold time period; and generating the recommended action to resolve the inefficiency, wherein the recommended action includes reviewing and adjusting autoscaling parameters associated with the first node and the second node.

8. The method of any one of the preceding embodiments, wherein the differences in the first configuration file and the second configuration file correspond to release versions, wherein the release versions can be determined by: identifying a first release version of the first configuration file associated with the first log, wherein the first release version corresponds to when the first configuration file was associated with the first node; identifying a second release version of the second configuration file associated with the second log, wherein the second release version corresponds to when the second configuration file was associated with the second node; comparing the first release version and the second release version and determining that the release versions are different when they do not match; and updating the recommended action to include instructions to update the first release version of the first configuration file or to update the second release version of the second configuration file.

9. The method of any one of the preceding embodiments, wherein the first instantiation threshold, the second instantiation threshold, the first destruction threshold, and the second destruction threshold comprise a CPU usage percentage, wherein the CPU usage percentage is a percentage of CPU available to the first node or the second node that is used to host the first plurality of applications or the second plurality of applications.

10. The method of any one of the preceding embodiments, wherein the first instantiation threshold, the second instantiation threshold, the first destruction threshold, and the second destruction threshold comprise a memory usage percentage, wherein the memory usage percentage is a percentage of memory available to the first node or the second node that is used to host the first plurality of applications or the second plurality of applications.

11. The method of any one of the preceding embodiments, wherein the recommended action is generated by: determining a frequent scaling event, wherein the frequent scaling event is determined by: retrieving an expected number of auto-scale events within a time interval; retrieving a number of auto-scale events within the time interval; and based on the number of auto-scale events exceeding the expected number of auto-scale events, determining the frequent scaling event; and generating the recommended action, wherein the recommended action comprises at least one of a log analysis recommendation, a microservice optimization recommendation, and an update to the first instantiation threshold, the second instantiation threshold, the first destruction threshold, and/or the second destruction threshold based on what caused the frequent scaling event.

12. The method of any one of the preceding embodiments, wherein the recommended action is time-based and based on a baseline of the first node in a timeframe by: recommending a reduction in resources at off-peak hours, wherein the off-peak hours occur when CPU usage and memory usage are lower than the baseline, and wherein the reduction in resources comprises increasing the first destruction threshold and the second destruction threshold; and recommending an increase in resources during peak hours, wherein the peak hours occur when CPU usage and memory usage are higher than the baseline, and wherein the increase in resources comprises decreasing the first instantiation threshold and the second instantiation threshold.

13. The method of any one of the preceding embodiments, wherein the recommended action is based on historical usage of the first node by: determining a historical use of the first node corresponding to a first timeframe, wherein the historical use is a percentage of CPU usage, a percentage of memory use, or a number of users; and updating the recommended action to recommend updates to the first instantiation threshold, the second instantiation threshold, the first destruction threshold, and the second destruction threshold.

14. The method of any one of the preceding embodiments, wherein generating the recommended action further comprises: determining that the inefficiency is excessive autoscaling, wherein the excessive autoscaling occurs when there is an increase in resources such that it negatively impacts the first node or the second node, or when there is a decrease in resources such that it negatively impacts the first node or the second node, wherein negatively impacting the first node or the second node comprises causing interruptions to one or more of the first plurality of applications on the first node and/or one or more of the second plurality of applications on the second node; and generating the recommended action to resolve the inefficiency, wherein the recommended action includes reviewing and adjusting autoscaling parameters associated with the first node and the second node.

15. One more tangible, non-transitory, computer-readable media storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for increasing efficiency of active-passive cluster configurations, the system comprising:
one or more processors; and
one or more non-transitory computer-readable media having instructions recorded thereon that when executed by the one or more processors, cause operations comprising:
receiving a first service log from an active server and a second service log from a passive server, wherein the passive server mirrors the active server, wherein the first service log comprises first metadata corresponding to the active server, and wherein the second service log comprises second metadata corresponding to the passive server, wherein the passive server serves as a backup for the active server;
identifying, in the first service log, a first configuration file, wherein the first configuration file comprises a first plurality of microservices hosted by the active server, a first instantiation threshold, and a first destruction threshold, wherein the first instantiation threshold and the first destruction threshold are based on availability of processing resources, wherein a configuration of the passive server is changed to match a configuration of the active server in response to exceeding the first instantiation threshold, and wherein the configuration of the passive server is changed to match the configuration of the active server in response to falling below the first destruction threshold;

identifying, in the second service log, a second configuration file, wherein the second configuration file comprises a second plurality of microservices hosted by the passive server;

inputting the first service log and the second service log into a model, wherein the model is trained to identify excessive autoscaling and configuration drift, by comparing the first configuration file and the second configuration file;

upon identifying differences between the first configuration file and the second configuration file indicative of excessive autoscaling and configuration drift, generating an alert, wherein the alert indicates the differences in the first configuration file and the second configuration file; and based on the alert, generating one or more instructions, wherein the one or more instructions comprises one or more actions to resolve the differences between the first configuration file and the second configuration file to mitigate excessive autoscaling and configuration drift of microservices hosted by the active server or the passive server.

2. A method for identifying and resolving inefficiencies in redundant node configurations, the method comprising:

receiving a first log from a first node and a second log from a second node, wherein the second node mirrors the first node, wherein the first log comprises first metadata corresponding to the first node, and wherein the second log comprises second metadata corresponding to the second node;

processing the first log and the second log to identify an inefficiency, by:

identifying, in the first log, a first configuration file, wherein the first configuration file comprises a first plurality of applications, a first instantiation threshold, and a first destruction threshold;

identifying, in the second log, a second configuration file, wherein the second configuration file comprises a second plurality of applications, a second instantiation threshold, and a second destruction threshold;

comparing the first configuration file and the second configuration file; and upon identifying differences between the first configuration file and the second configuration file, assigning the differences as the inefficiency; and generating an alert, based on the inefficiency, wherein the alert comprises a recommended action to resolve the inefficiency, wherein the recommended action comprises a modification to the first configuration file and/or the second configuration file.

3. The method of claim 2, wherein the first metadata and the second metadata include configuration information associated with the first node and the second node, wherein the configuration information comprises a plurality of microservices, and a number of resources allocated to each microservice in the plurality of microservices, wherein the number of resources includes an instantiation threshold and a destruction threshold.

4. The method of claim 2, further comprising a cluster manager, wherein the cluster manager performs the recommended action included in the alert.

5. The method of claim 2, wherein generating the alert further comprises:

determining the inefficiency is configuration drift, wherein the configuration drift occurs when an alteration is made to the first configuration file, and the alteration is not made to the second configuration file; and generating the recommended action to resolve the inefficiency, wherein the recommended action includes reviewing the first log and the second log and updating the first configuration file and the second configuration file to resolve differences in configuration.

6. The method of claim 2, wherein generating the alert further comprises:

determining that the inefficiency is excessive autoscaling, wherein the excessive autoscaling occurs when the first instantiation threshold and the first destruction threshold are met within a threshold time period or when the second instantiation threshold and the second destruction threshold are met within the threshold time period; and generating the recommended action to resolve the inefficiency, wherein the recommended action includes reviewing and adjusting auto-scaling parameters associated with the first node and the second node.

7. The method of claim 2, wherein the differences in the first configuration file and the second configuration file correspond to release versions, wherein the release versions can be determined by:

identifying a first release version of the first configuration file associated with the first log, wherein the first release version corresponds to when the first configuration file was associated with the first node;

identifying a second release version of the second configuration file associated with the second log, wherein the second release version corresponds to when the second configuration file was associated with the second node;

comparing the first release version and the second release version and determining that the release versions are different when they do not match; and updating the recommended action to include instructions to update the first release version of the first configuration file or to update the second release version of the second configuration file.

8. The method of claim 2, wherein the first instantiation threshold, the second instantiation threshold, the first destruction threshold, and the second destruction threshold comprise a CPU usage percentage, wherein the CPU usage percentage is a percentage of CPU available to the first node or the second node that is used to host the first plurality of applications or the second plurality of applications.

9. The method of claim 2, wherein the first instantiation threshold, the second instantiation threshold, the first destruction threshold, and the second destruction threshold comprise a memory usage percentage, wherein the memory usage percentage is a percentage of memory available to the first node or the second node that is used to host the first plurality of applications or the second plurality of applications.

10. The method of claim 2, wherein the recommended action is generated by:

determining a frequent scaling event, wherein the frequent scaling event is determined by:

retrieving an expected number of auto-scale events within a time interval;

retrieving a number of auto-scale events within the time interval; and based on the number of auto-scale events exceeding the expected number of auto-scale events, determining the frequent scaling event; and generating the recommended action, wherein the recommended action comprises at least one of a log analysis recommendation, a microservice optimization recommendation, and an update to the first instantiation threshold, the second instantiation threshold, the first destruction threshold, and/or the second destruction threshold based on what caused the frequent scaling event.

11. The method of claim 2, wherein the recommended action is time-based and based on a baseline of the first node in a timeframe by:

recommending a reduction in resources at off-peak hours, wherein the off-peak hours occur when CPU usage and memory usage are lower than the baseline, and wherein the reduction in resources comprises increasing the first destruction threshold and the second destruction threshold; and recommending an increase in resources during peak hours, wherein the peak hours occur when CPU usage and memory usage are higher than the baseline, and wherein the increase in resources comprises decreasing the first instantiation threshold and the second instantiation threshold.

12. The method of claim 2, wherein the recommended action is based on historical usage of the first node by:

determining a historical use of the first node corresponding to a first timeframe, wherein the historical use is a percentage of CPU usage, a percentage of memory use, or a number of users; and updating the recommended action to recommend updates to the first instantiation threshold, the second instantiation threshold, the first destruction threshold, and the second destruction threshold.

13. One or more non-transitory, computer-readable media storing instructions that, when executed by one or more processors, cause operations comprising:

receiving a first log from a first node and a second log from a second node, wherein the second node mirrors the first node, wherein the first log comprises first metadata corresponding to the first node, and wherein the second log comprises second metadata corresponding to the second node;

processing the first log and the second log to identify an inefficiency, by:

identifying, in the first log, a first configuration file, wherein the first configuration file comprises a first plurality of applications, a first instantiation threshold, and a first destruction threshold;

identifying, in the second log, a second configuration file, wherein the second configuration file comprises a second plurality of applications, a second instantiation threshold, and a second destruction threshold;

comparing the first configuration file and the second configuration file; and upon identifying differences between the first configuration file and the second configuration file, assigning the differences as the inefficiency;

generating a recommended action to resolve the inefficiency, wherein the recommended action comprises a modification to the first configuration file and/or the second configuration file; and performing the recommended action, by a cluster manager, wherein the cluster manager can make changes to the first configuration file and the second configuration file.

14. The one or more non-transitory, computer-readable media of claim 13, wherein generating the recommended action further comprises:

determining that the inefficiency is excessive autoscaling, wherein the excessive autoscaling occurs when there is an increase in resources such that it negatively impacts the first node or the second node, or when there is a decrease in resources such that it negatively impacts the first node or the second node, wherein negatively impacting the first node or the second node comprises causing interruptions to one or more of the first plurality of applications on the first node and/or one or more of the second plurality of applications on the second node; and generating the recommended action to resolve the inefficiency, wherein the recommended action includes reviewing and adjusting auto-scaling parameters associated with the first node and the second node.

15. The one or more non-transitory, computer-readable media of claim 13, wherein the differences in the first configuration file and the second configuration file correspond to release versions, wherein the release versions can be determined by:

identifying a first release version of the first configuration file associated with the first log, wherein the first release version corresponds to when the first configuration file was associated with the first node;

identifying a second release version of the second configuration file associated with the second log, wherein the second release version corresponds to when the second configuration file was associated with the second node;

comparing the first release version and the second release version and determining that the release versions are different when they do not match; and updating the recommended action to be updating the first release version of the first configuration file or updating the second release version of the second configuration file.

16. The one or more non-transitory, computer-readable media of claim 13, wherein the first instantiation threshold, the second instantiation threshold, the first destruction threshold, and the second destruction threshold comprise a CPU usage percentage, wherein the CPU usage percentage is a percentage of CPU available to the first node or the second node that is used to host the first plurality of applications or the second plurality of applications.

17. The one or more non-transitory, computer-readable media of claim 13, wherein the first instantiation threshold, the second instantiation threshold, the first destruction threshold, and the second destruction threshold comprise a memory usage percentage, wherein the memory usage percentage is a percentage of memory available to the first node or the second node that is used to host the first plurality of applications or the second plurality of applications.

18. The one or more non-transitory, computer-readable media of claim 13, wherein the recommended action is generated by:

determining a frequent scaling event, wherein the frequent scaling event is determined by:

retrieving an expected number of auto-scale events within a time interval;

retrieving a number of auto-scale events within the time interval; and based on the number of auto-scale events exceeding the expected number of auto-scale events, determining the frequent scaling event; and generating the recommended action, wherein the recommended action comprises at least one of a log analysis recommendation, a microservice optimization recommendation, and an update to the first instantiation threshold, the second instantiation threshold, the first destruction threshold, and/or the second destruction threshold based on what caused the frequent scaling event.

19. The one or more non-transitory, computer-readable media of claim 13, wherein the recommended action is time-based and based on a baseline of the first node in a timeframe by:

recommending a reduction in resources at off-peak hours, wherein the off-peak hours occur when CPU usage and memory usage are lower than the baseline, and wherein the reduction in resources comprises increasing the first destruction threshold and the second destruction threshold; and recommending an increase in resources during peak hours, wherein the peak hours occur when CPU usage and memory usage are higher than the baseline, and wherein the increase in resources comprises decreasing the first instantiation threshold and the second instantiation threshold.

20. The one or more non-transitory, computer-readable media of claim 13, wherein the recommended action is based on historical usage of the first node by:

determining a historical use of the first node corresponding to a first timeframe, wherein the historical use is a percentage of CPU usage, a percentage of memory use, or a number of users; and updating the recommended action to recommend updates to the first instantiation threshold, the second instantiation threshold, the first destruction threshold, and the second destruction threshold.

* * * * *